(12) United States Patent
Qiu et al.

(10) Patent No.: US 8,464,843 B2
(45) Date of Patent: Jun. 18, 2013

(54) LOCKABLE CASTER WHEELS

(75) Inventors: Ying Qiu, Guangdong (CN); Liming Fang, Guangdong (CN); Jinyuan Xu, Guangdong (CN); Jie Ma, Guangdong (CN)

(73) Assignee: Rocateq International B.V., Barendrecht (NL)

( * ) Notice: Subject to any disclaimer, the term of this patent is extended or adjusted under 35 U.S.C. 154(b) by 393 days.

(21) Appl. No.: 12/864,159

(22) PCT Filed: Sep. 22, 2009

(86) PCT No.: PCT/CN2009/074104
§ 371 (c)(1),
(2), (4) Date: Jul. 22, 2010

(87) PCT Pub. No.: WO2010/037328
PCT Pub. Date: Apr. 8, 2010

(65) Prior Publication Data
US 2011/0023267 A1 Feb. 3, 2011

(30) Foreign Application Priority Data

Sep. 30, 2008 (CN) ...................... 2008 2 0201506 U
Oct. 15, 2008 (CN) ...................... 2008 2 0202130 U

(51) Int. Cl.
*B60B 33/00* (2006.01)
(52) U.S. Cl.
USPC .............. 188/1.12; 188/291; 188/19; 188/31
(58) Field of Classification Search
USPC ....... 188/291, 1.12, 19, 20, 30, 31, 2 F; 16/18 R–18 B, 35 R, 35 D, 45
See application file for complete search history.

(56) References Cited

U.S. PATENT DOCUMENTS

| 4,691,589 A | * | 9/1987 | Arakawa ...................... 464/180 |
| 6,041,899 A | * | 3/2000 | Takamatsu .................... 188/290 |
| 6,945,366 B2 | | 9/2005 | Taba | |

FOREIGN PATENT DOCUMENTS

| CN | 201291713 Y | 8/2009 |
| DE | 19517729 A1 | 2/1996 |
| JP | 2000-158903 A | 6/2000 |
| JP | 2002-145030 A | 5/2002 |
| JP | 2002-282314 A | 10/2002 |
| JP | 2002282314 A | * 10/2002 |

OTHER PUBLICATIONS

International Search Report dated Nov. 25, 2009.

* cited by examiner

*Primary Examiner* — Xuan Lan Nguyen
(74) *Attorney, Agent, or Firm* — Cozen O'Connor

(57) ABSTRACT

The invention relates a lockable caster wheel. The lockable caster wheel can be widely used in shopping carts, luggage carts, strollers, turnover carts, stretcher cars and many other trolleys. The controlling mechanism of the lockable caster wheel comprises a controller which comprises a signal receiving device and a locking device which is controlled by the controller. The locking mechanism further comprises a revolving damper which comprises a shell having a restricting structure and a damping wheel located inside the shell. The shell, through its restricting structure, separates from or connects with the locking device to form unlocked or locked states. The damping wheel connects with the wheel assembly. The caster wheel uses a damper. Beyond the allowed area of use, the trolleys can be slowly pushed for a few of meters because of the damper effect, but it will not suddenly stop completely. Therefore it will not present danger to the users. It can also prevent the casters from being damaged by a forceful push when they are locked.

19 Claims, 8 Drawing Sheets

LOCKABLE CASTER WHEELS

The present application is the U.S. National Stage of International Application No. PCT/CN2009/074104, filed Sep. 22, 2009, which claims the priority benefit of Chinese Application No. 200820201506.9, filed on Sep. 30, 2008 and Chinese Application No. 200820202130.3, filed on Oct. 15, 2008. The entire content of both of the foregoing applications is expressly incorporated herein by reference.

FIELD OF THE INVENTION

The invention relates to a caster wheel. More particularly, the invention relates to a lockable caster wheel.

BACKGROUND OF THE INVENTION

Supermarket shopping becomes an essential consumer behavior of the modern society. Supermarket shopping carts, as convenient means of delivery, play an important role. After the shoppers finished using the shopping carts, the employees of the supermarkets return the carts to the original places. This consumes many human resources and increases the labor costs. Shopping carts may also be stolen. Shopping carts are expensive, losing them costs dearly to the supermarkets.

To secure shopping carts and to reduce labor costs, anti-stealing shopping carts have been developed. The basic principle is that a wheel of the shopping cart can be automatically locked through the supermarket's security settings so that the shopping cart cannot be pushed away.

Sudden locking of the shopping cart through the security settings may damage the wheel of the shopping cart. Furthermore, sudden locking of the shopping carts may present danger to the users who are using them. Therefore, new shopping carts, which are both stealing-proof and safe to the users, are needed.

DESCRIPTION OF THE INVENTION

The main objective of this invention is to provide a caster which prevents its wheels from sudden locking but remaining the anti-theft features.

In order to achieve the above objective, the invention provides a lockable caster wheel. The caster wheel comprises a wheel frame and a wheel assembly which is rotationally supported on the frame. The wheel frame has a locking mechanism which acts on the wheel assembly. The locking mechanism comprises a controller and a locking device which is controlled by the controller. The locking mechanism further comprises a revolving damper, the damper comprises a shell having a restricting structure and a damping wheel located inside the shell. The shell, through its restricting structure, separates from or connects with the locking device to form unlocked or locked states, respectively. The damping wheel connects with the wheel assembly. The wheel assembly comprises a tire body, a bearing, and a first gear; and the first gear and the bearing are connected through the same axis and fixed on the tire body.

The locking device comprises a driving part, a transmission part, and an operative part. The driving part is a motor; the transmission part is a group of speed-reduction gears; and the operative part comprises a locking rod and a rotating head which is connected to the speed-reduction gears; and the locking rod has an elastic recovery component. The rotating head is a cam and the elastic recovering component is a torsion spring.

The damping wheel is rotationally set inside the shell. The space between the damping wheel and the shell forms a closed chamber; the chamber is filled with damping oil; between the shell and the damping wheel are provided with sealing to prevent the damping oil from leaking.

The damping wheel comprises a base, a center, a first circular wall, and a second circular wall; the first circular wall and second circular wall form a first loop, and the second circular wall and the center form a second loop; the inner surface of the shell has a third circular wall which coordinates in space with the first loop and a fourth circular wall which coordinates with in space with the second loop. The center has a bearing bore which circumferentially fixes a rotation axis. The bearing bore is a racetrack-shaped through-hole, which is in the shape of a rectangle with two rounded ends. Because between the damping wheel and the shell are provided with the circular walls and loops, and because the circular walls and loops form clearance fit, during the rotation of the damping wheel in relative to the shell, the friction area between the damping wheel and damping oil is increased. Thus assuming the size of the damper and viscosity of the damping oil are the same, a greater damping value is achieved thereby.

The base of the damping wheel has several concave chambers; each concave chamber is filled with oil storage cotton. When the damping wheel rotates in relative to the shell, the damping oil inside the shell expands due to heat from the friction; the oil storage cotton absorbs the damping oil and keeps the pressure inside the damper and the damping value constant. When the damping wheel stops rotating, the damping oil returns to the ambient temperature and the oil storage cotton releases damping oil to keep the pressure inside the damper and the damping value constant.

The shell comprises a cover which is connected through screws with the base. Sealing is provided between the base and the cover, between the center of the damping wheel and the base, and between the center and the cover. The base is provided with a first oil port which is connected to the sealed chamber. The cover is provided with a second oil port which is also connected with the sealed chamber. The first and second oil ports are, respectively, sealed by a first sealing and a second sealing. The circumferential side wall of the shell is provided with a restricting structure which coordinates with a locking device. The restricting structure is a number of ring-sector-shaped grooves evenly distributed along the circumferential side wall.

The shell and the damping wheel can both be cylinder-shaped metal parts.

The wheel assembly comprises a tire body, a bearing, and a first gear; the first gear and the bearing are linked through a same axis and fixed on the tire body. The damping wheel is linked through gear driving mechanism with the first gear. The gear driving mechanism comprises parallel gear shaft and damping wheel shaft; one end of the gear shaft meshes, through a second gear, with the first gear; the other end of the gear shaft meshes, through a third gear, with a fourth gear at one end of the damping wheel shaft; and the damping wheel shaft and the damping wheel are circumferentially fixed.

The wheel frame comprises a metal stand and a plastic shell in which the controller, locking device, and revolving damper are contained. The wheel assembly is set in the middle or approximately the middle of the plastic shell. Alternatively, the wheel assembly is set in the side of the plastic shell.

Compared with the existing technology, this invention provides the following benefits and useful results:

1) The caster, after passing anti-theft zoon, becomes difficult to move, and so the purpose theft prevention is achieved;

2) It resolves a common problem of the existing anti-theft casters, i.e., the danger to the users when the caster is suddenly locked.

3) It resolves the issue of the tire damage caused by continued moving of the caster after it has been locked.

4) The caster wheel of the invention can be widely used in shopping carts, luggage carts, strollers, turnover carts, stretcher cars and many other trolleys.

EMBODIMENTS

The invention is further illustrated by the following embodiments in combination with figures. In all of the figures, the same tag will be used to refer to the same components, features, or structures. The specific structures or components of the embodiments are used only as examples to help persons skilled in the art to understand the invention. Persons skilled in the art may follow the spirit of this invention to design a variety of the same or similar structures which fall within the scope of this invention. Thus it is inappropriate to limit the invention to the embodiments. Any equivalent or similar designs will fall within the scope of protection of this invention. To be concise, applicants do not describe any functions and structures which are known in the art.

Figure 1:
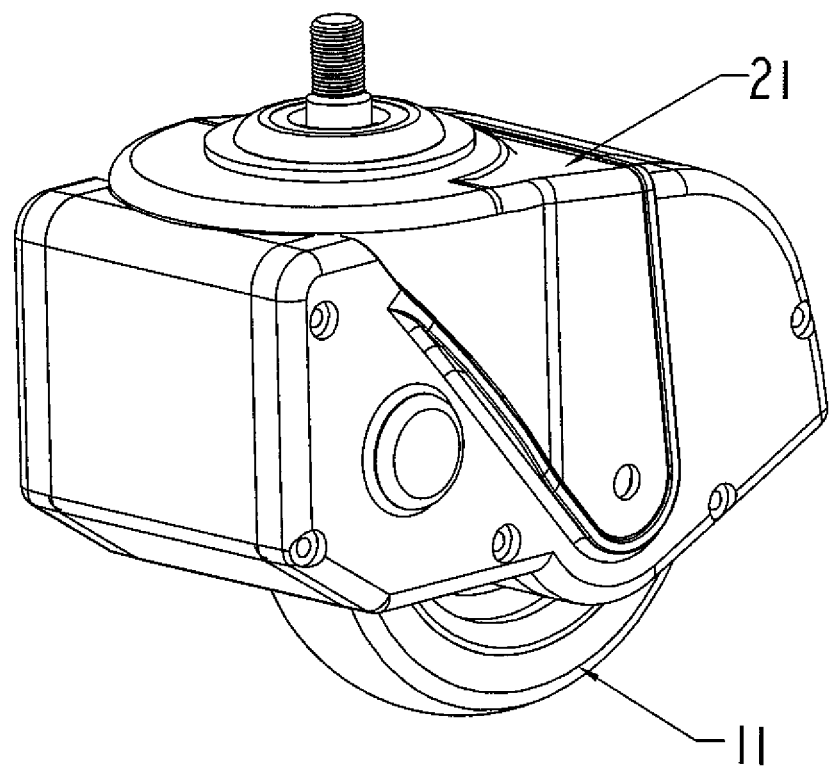
FIG. 1 is a three-dimensional view of a preferred embodiment of the caster of the invention.
Figure 2:
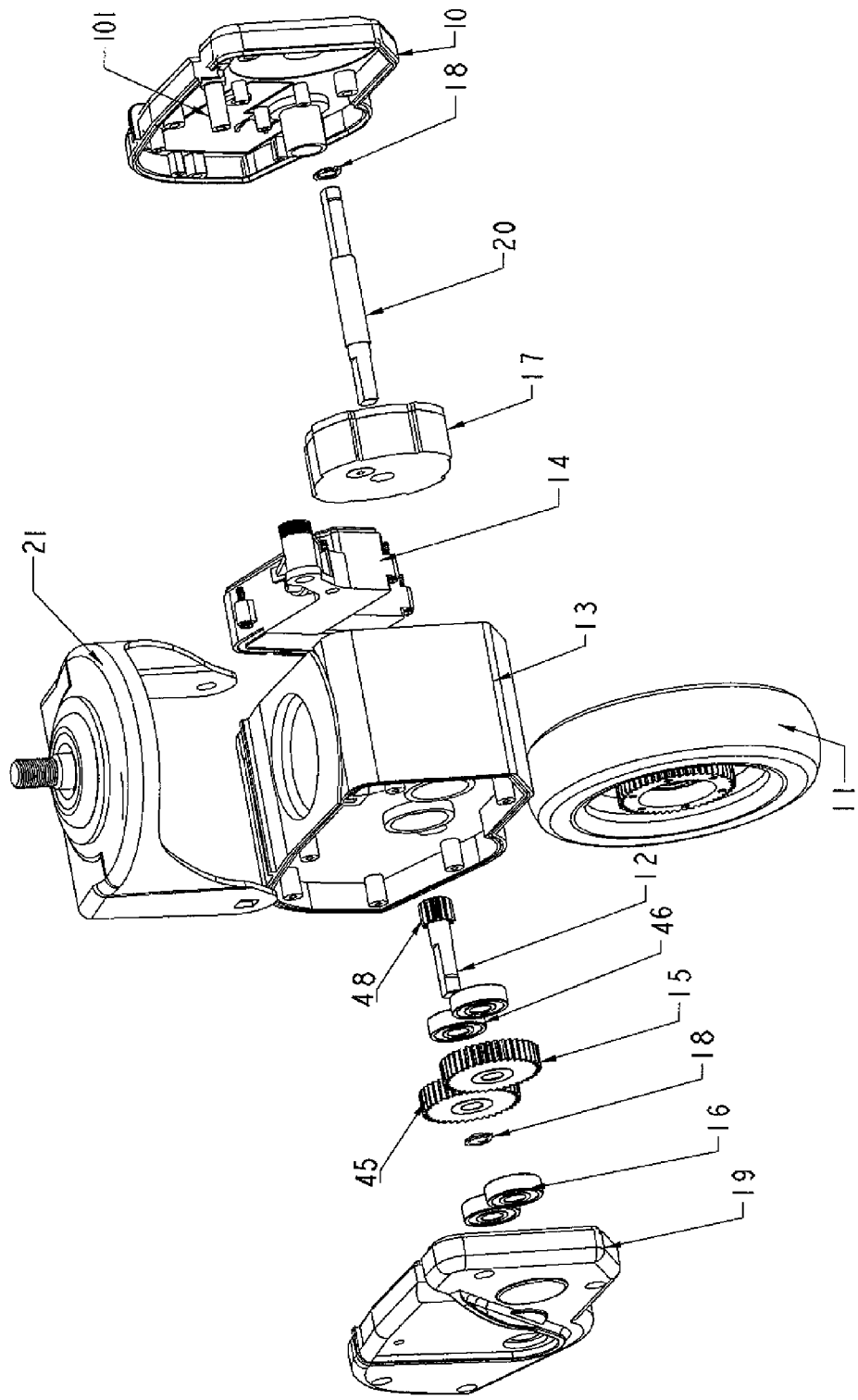
FIG. 2 is an illustrative view of the parts of the caster in FIG. 1.
Figure 3:
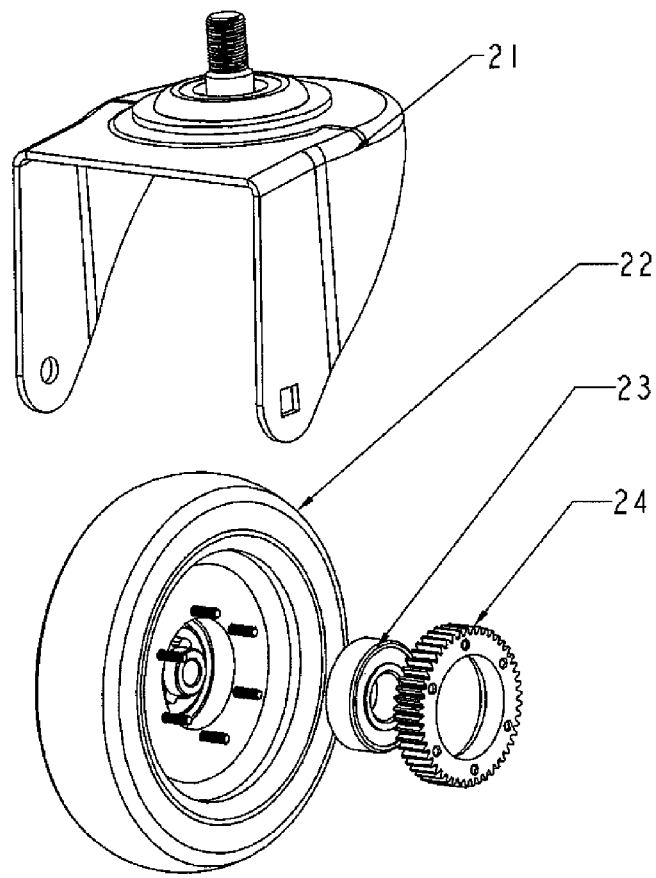
FIG. 3 is an illustrative view of the wheel component parts of FIG. 2.
Figure 4:
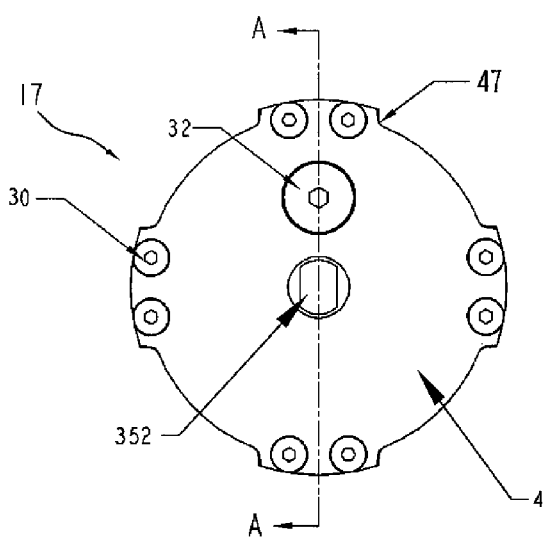
FIG. 4 is a front view of the damper of FIG. 2.
Figure 5:
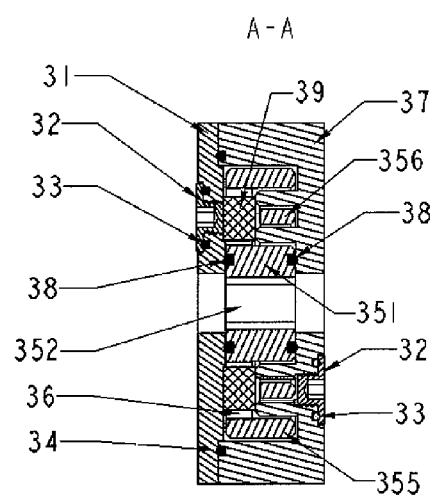
FIG. 5 is an A-A sectional view of FIG. 4.
Figure 6:
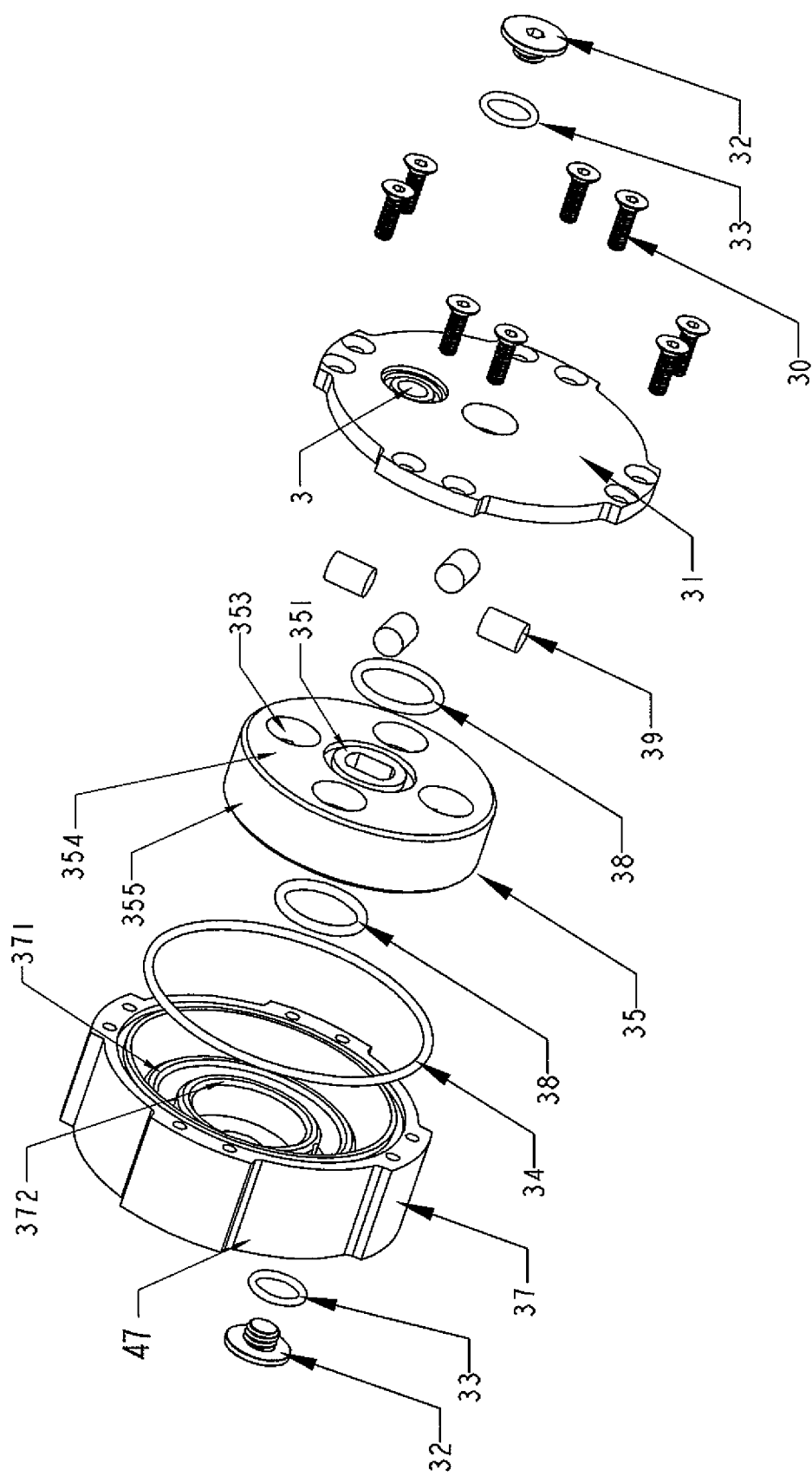
FIG. 6 is an illustrative view of the damper parts of FIG. 2.
Figure 7:
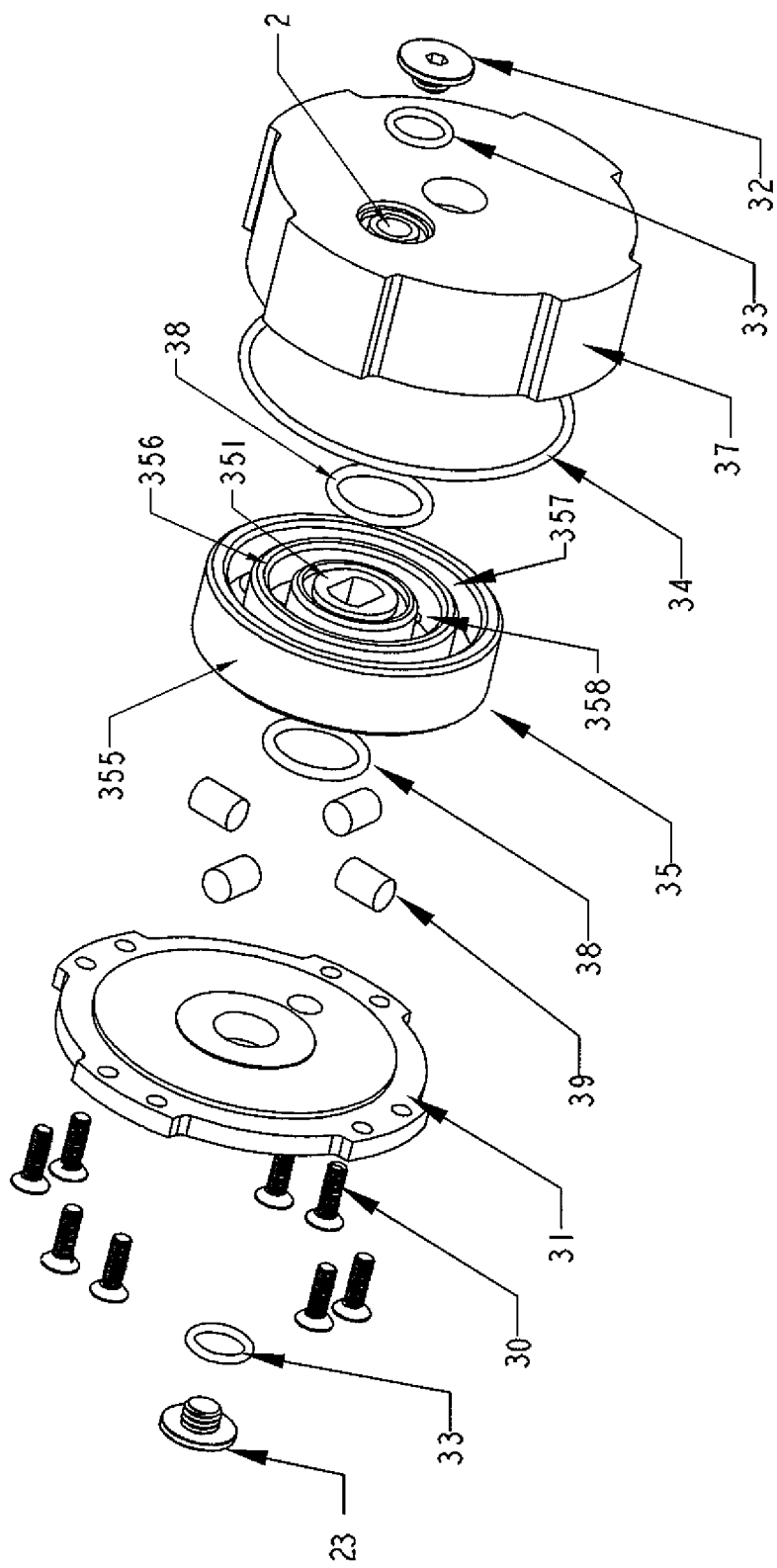
FIG. 7 is an illustrative view of the damper parts from a different anger.
Figure 8:
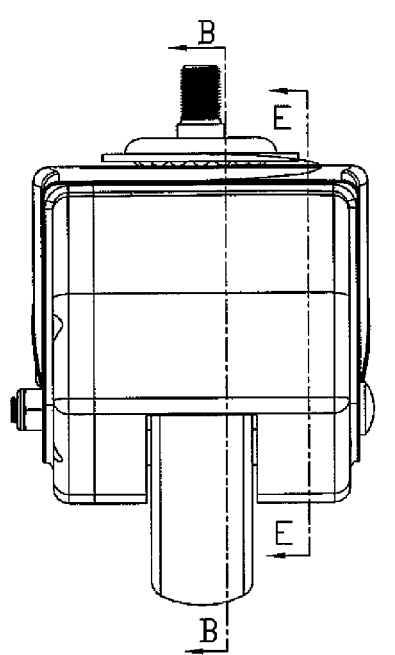
FIG. 8 is a front view of the caster of FIG. 1.

As illustrated in FIG. 1 to FIG. 3, the caster wheel mainly includes an iron stand 21, plastic shell, and wheel assembly 11. The plastic shell consists of a main part 13, a controller cover 10 which is located on two sides of the main part 13 and is removable, and the gearbox cover 19. The controller 5 having a signal receiving part, the locking device 14, and revolving damper 17 are installed inside the chamber formed by the main part 13 and the controller cover 10. The gear shaft 12, bearing 16, second gear 48, third gear 45, fourth gear 15, and spring 18 are located inside the chamber formed by the main part 13 and the gearbox cover 19. The damping axle 20 pass through the fourth gear 15, main part 13, and damper 17, and its ends are, respectively, supported on the bearing 16 and bearing 25.

As illustrated by FIG. 3, the wheel assembly 11 is mounted, through a bearing (which is not shown), on the iron stand 21. The wheel assembly 11 includes the tire body 22, bearing 23, and first gear 24; the first gear 24, bearing 23, and tire body 22 are locked together by screws. When the tire body 22 rotates, the first gear 24 follows it to rotate.

As illustrated in FIG. 4 to FIG. 7, the damper 17 includes a roughly cylinder-shaped metal shell 4 formed by cover 31 and base 37. The circumferential side wall of shell 4 has a number of ring-sector-shaped, evenly distributed limiting grooves 47 which coordinate with the locking device to prevent the shell from moving. Cover 31 is linked, through several screws 30, with the base 37; between base 37 and cover 31 are provided with a relatively large o-ring 34. The base 37 has a first oil port 2; the cover 31 has a second oil port 3; the first oil port 2 and the second oil port 3 each has a sealing screw 32 which coordinates with a relatively small o-ring 33. The shell 4 formed by the base 37 and cover 31 can rotationally set up a roughly cylinder-shaped metal damping wheel 35.

The damping wheel 35 comprises a base 354, a center 351, a first circular wall 355, and a second circular wall 356; the first circular wall 355 and second circular wall 356 form a first loop 357, and the second circular wall 356 and the center 351 form a second loop 358; the inner surface of the base 37 has a third circular wall 371 which coordinates in space with the first loop 357 and a fourth circular wall 372 which coordinates in space with the second loop 358. Between the center 351 of the damping wheel 35 and the base 37 and between the center 351 and the cover 31 are, respectively, provided with an o-ring 38. The shell 4 and the damping wheel 35 form a closed chamber. The first oil port 2 and the second oil port 3 connect with the closed chamber. The center 351 of the damping wheel 35 has a racetrack-shaped bearing bore 352, which is in the shape of a rectangle with two rounded ends. The bearing bore 352 fixes circumferentially with a rotation axis which it controls. Four cylinder-shaped oil storage cottons 39 are placed in four circular concaves 353 set on the base 354 of the damping wheel 35. When the damping wheel 35 rotates in relative to the shell 4, the damping oil of the shell 4 expands due to heat from the friction and the oil storage cotton 39 absorbs oil to keep the damper pressure and damping effect constant. When the damping wheel rotation stops, the damping oil returns to the ambient temperature and the oil storage cotton releases oil to keep the damper pressure and damping effect constant.

The working principle of the damper 1 is as follows. When the damping oil 36 is injected into the closed chamber through one of the oil ports (either the first oil port 2 or the second oil port 3), the other oil port is used to release gas to form vacuum in the chamber. After the damping oil injection is done, both oil ports are sealed through sealing screws 32 to prevent the damping oil 36 from leaking out. When the rotation of the shell 4 is restricted by the coordination of the locking device and the evenly distributed limiting grooves 47 on the shell 4, and at the same time the damping wheel 35 is driven by the rotation axis which passes through the bearing bore 352, the damping wheel 35 rotates in relative to shell 4, the damping oil 36 sealed inside the closed chamber passes through each of the loops and the circular walls and produces a resistance against the damping wheel 35 to rotate in relative to the shell 4. Therefore the rotation of the damping wheel slows down. To keep relative rotation between them, a sufficiently large external force must be used.

Figure 9:
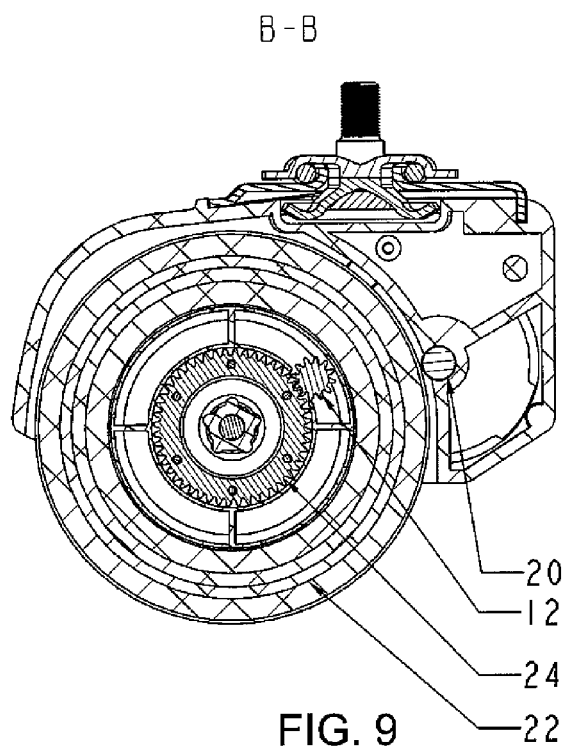
FIG. 9 is a B-B sectional view of FIG. 8.
Figure 10:
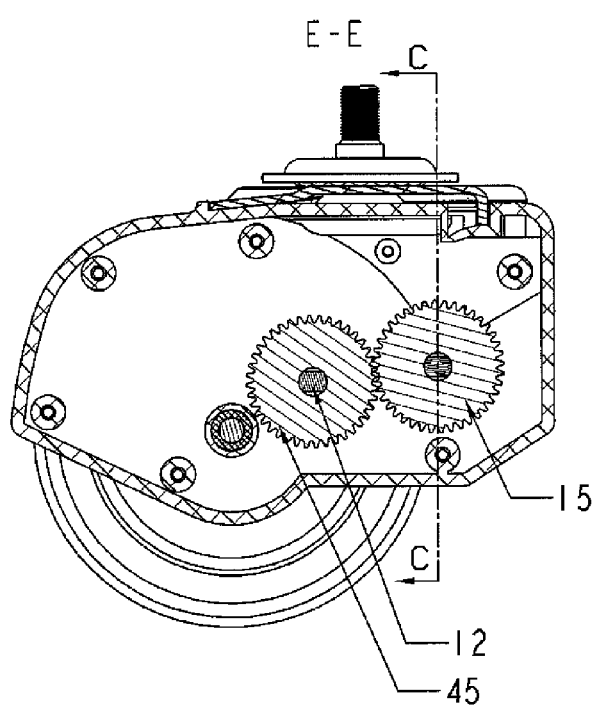
FIG. 10 is an E-E sectional view of FIG. 8.
Figure 11:
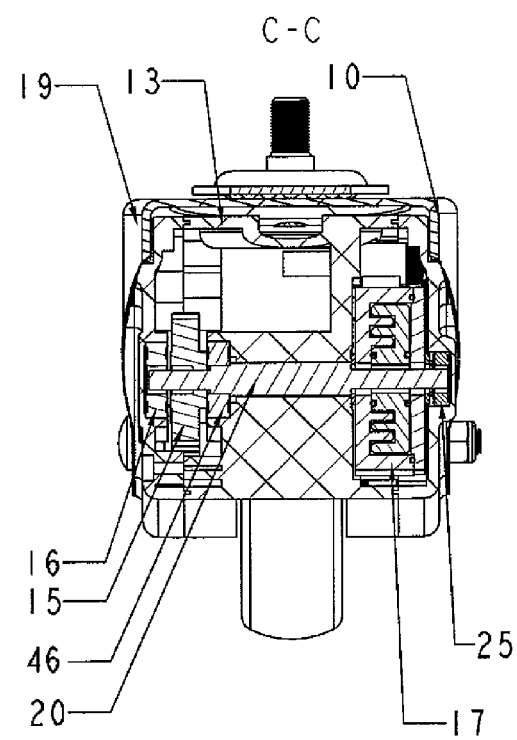
FIG. 11 is a C-C sectional view of FIG. 10.

Once the above caster wheel is installed on a shopping cart, when a user pushes the cart during shopping, the tire body 22 rolls against the ground. In FIG. 9, because the first gear 24 and the tire body 22 are locked each other, it causes the first gear 24 and the tire body 22 to rotate together and therefore drives the gear rod 12 through the mesh between the first gear 24 and the second gear 48. In FIG. 10, the racetrack-shaped bearing of the gear rod 12 coordinates with the racetrack-shaped hole of the third gear 45, the rotation of the gear rod 12 drives the third gear 45, and the third gear 45 drives the fourth gear 15 through gear meshing. In FIG. 11, damping wheel axle 20 is fixed with three bearings 16, 46 and 25 and sets the damper 17 together in the chamber formed by the main body 13, controller cover 10 and gearbox cover 19. Due to the circumferential fit formed by the racetrack-shaped bearing of the damping wheel and the racetrack-shaped through-hole of the damping wheel 35 of the damper 17, the rotation of the gear rod 12 drives the third gear 45, which then drives the fourth gear 15, which then drives the damping wheel rod 20. Further the damping wheel 35 drives the damper 17.

Figure 12:
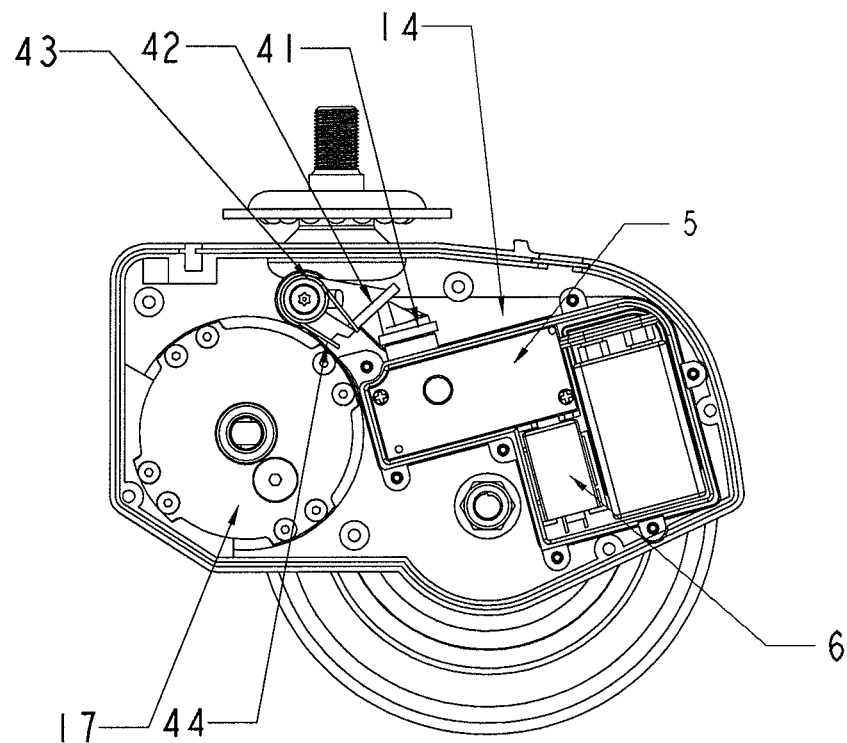
FIG. 12 is an illustrative view of the caster of FIG. 1 in an unlocked state.
Figure 13:
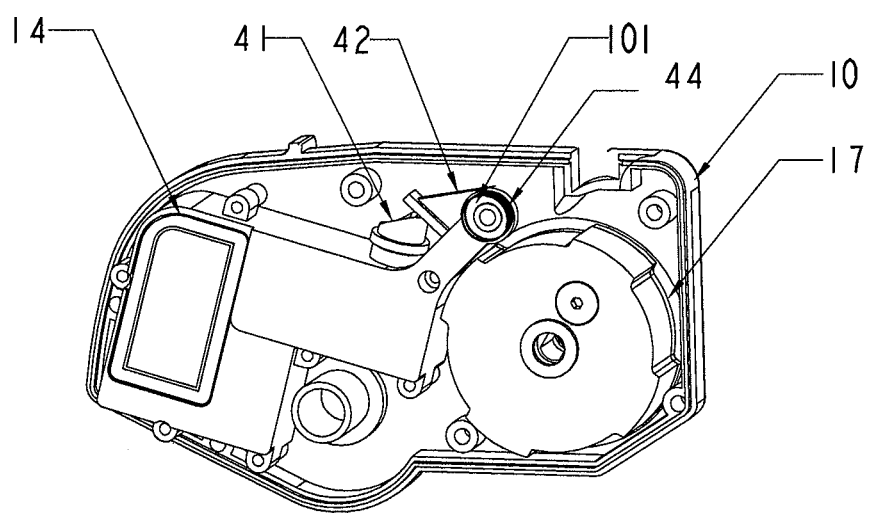
FIG. 13 is another illustrative view of the caster of FIG. 1 in an unlocked state.

FIGS. 12 and 13 show the unlocked state, that is, the shopping carts are in the shopping center where the use of carts is permitted. At this time, the damper 17 provides no restriction. The users can freely and actively use the shopping carts.

Figure 14:
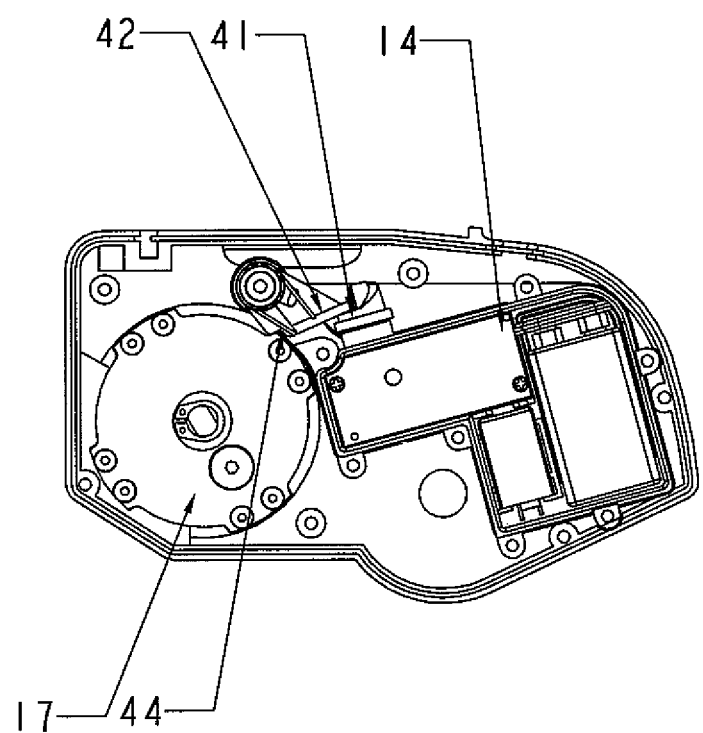
FIG. 14 is an illustrative view of the caster of FIG. 1 in a locked state.

When users push the shopping carts outside the permitted boundary line of the shopping center, the secure system of the shopping center sends a locking signal through the radio frequency or any other methods to the signal receiving device. When the signal is received, the controller 5 turns on the motor 6 inside the locking device 14 and the motor 6, through the speed-reduction gears of the locking device 14, drives the rotating head 41 in the form of a cam to turn 90° clockwise and then stops. Because the locking rod 42 is fixed on the locking rod bearing 101 of the controller cover 10, the locking rod 42 can only make circular movement around the locking rod bearing 101 of the controller cover 10. Under the action of the torsion spring 44, the locking rod 42 rotates counter-clockwise as shown in FIG. 13 until it is pushed against the rotating head 41. At this time, the locking rod 42 stays in the position as shown in FIG. 14. It is in a locked state. Under this circumstance, when the user pushes the shopping cart, the force is transferred through the gear driving mechanism to the damper 17. The damper 17 rotates counter-clockwise as shown in FIG. 14 and the locking rod 42 blocks the limiting grooves 47 to make it impossible for the shell to rotate. Thus the damping wheel bearing 20 can only drive the damping wheel 35 to make circular movement. When the damping wheel 35 rotates, it receives resistance from the damping oil 36. The resistance reacts, through the gear mechanism, on the wheel assembly 11 so that the user must use a large force to push the shopping cart to move.

When the shopping center staff and users push the shopping carts which are in the locked state close to the permitted boundary line, the security system of the shopping center sends an unlocking signal through the radio frequency or other method to the signal receiving device of the controller. Upon receiving the unlocking signal, the motor 6 inside the locking device 14 of the controller turns on and it, through the group of the speed-reduction gears, drives the rotating head 41 in the form of a cam to rotate clockwise. When the locking rod 42 reaches the top of the rotating head 41, the motor 6 turns off. Thus the shopping cart returns to the unlocked position as shown in FIGS. 12 and 13 and the user can push it freely and actively inside the permitted area of the shopping center.

In summary, the structure of the casters can ensure that the trolleys can only be used in the allowed area. If the trolleys are pushed outside the allowed area, the control mechanism will produce a high resistance so that the user is unable to continue pushing the trolleys. Therefore it provides the trolleys with the security features. The casters are designed to employ dampers. Beyond the allowed area, the trolleys can be slowly pushed for a few of meters because of the damper effect, but it will not suddenly completely stop. Therefore it will not present danger to the users. It can also prevent the casters from being damaged by a forceful push when they are locked.

INDUSTRIAL UTILITIES

The caster wheel of the invention uses a damper. Beyond the allowed area of use, the trolleys can be slowly pushed for a few of meters because of the damper effect, but it will not suddenly stop completely. Therefore it will not present danger to the users. It can also prevent the casters from being damaged by a forceful push when they are locked. The caster wheel of the invention can be widely used in shopping carts, luggage carts, strollers, turnover carts, stretcher cars and many other trolleys.

We claim:

1. A lockable caster wheel, comprising a wheel frame and wheel assembly which is rotationally supported on the wheel frame; the wheel frame having a locking mechanism acting on the wheel assembly; the locking mechanism comprising a controller and a locking device corresponding with the controller; wherein the locking mechanism further comprises a revolving damper; the damper comprises a shell having a restricting structure and a damping wheel located inside the shell; wherein the shell, through its restricting structure, separates from or connects with the locking device to form a free, rotating state or a locked, non-rotating state, respectively; wherein the damping wheel is connected through the transmission of motion with the wheel assembly; wherein the wheel assembly comprises a tire body, a bearing and a first gear; and wherein the first gear and the bearing are connected through the same axis and fixed on the tire body.

2. The lockable caster wheel of claim 1, wherein the locking device comprises a driving part and an operative part.

3. The lockable caster wheel of claim 2, wherein the driving part comprises a motor; the operative part comprises a locking rod and a rotating head which acts on the locking rod; and the locking rod has an elastic recovery component.

4. The lockable caster wheel of claim 3, wherein the rotating head is a cam and the elastic recovering component is a torsion spring.

5. The lockable caster wheel of claim 1, wherein the damping wheel is rotationally set inside the shell; the damping wheel and the shell form a closed chamber; the chamber is filled with damping oil; between the shell and the damping wheel are provided with a sealing to prevent the damping oil from leaking.

6. The lockable caster wheel of claim 5, wherein the damping wheel comprises a base, a center, a first circular wall, and a second circular wall; said first circular wall and second circular wall form a first loop and the second circular wall and the center forms a second loop; the inner surface of the shell has a third circular wall which coordinates in space with the first loop and a fourth circular wall which coordinates in space with the second loop.

7. The lockable caster wheel of claim 6, wherein the center has a bearing bore which circumferentially fixes a rotation axis.

8. The lockable caster wheel of claim 7, wherein the bearing bore is a through-hole in the shape of a rectangle with two rounded ends.

9. The lockable caster wheel of claim 6, wherein the base has several concave chambers, and each concave chamber is filled with oil storage cotton.

10. The lockable caster wheel of claim 5, wherein the shell comprises a cover which is connected through screws with a base, wherein the sealing is provided between the base of the shell and the cover, between the center of the damping wheel and the base of the shell, and between the center of the damping wheel and the cover.

11. The lockable caster wheel of claim 10, wherein the base of the shell is provided with a first oil port which is connected to the sealed chamber; the cover is provided with a second oil port which is connected with the sealed chamber; and the first and second oil ports are respectively sealed by a first sealing and a second sealing.

12. The lockable caster wheel of claim 11, wherein the circumferential side wall of the shell is provided with the restricting structure which coordinates with the locking device.

13. The lockable caster wheel of claim 12, wherein the restricting structure is a number of ring-sector-shaped grooves which are evenly distributed along the circumferential side wall.

14. The lockable caster wheel of claim 5, wherein both of the shell and the damping wheel are made by metal.

15. The lockable caster wheel of claim 5, wherein both of the shell and the damping wheel are cylinder-shaped.

16. The lockable caster wheel of claim 1, wherein the damping wheel is linked, through a gear driving mechanism, with the first gear; the gear driving mechanism comprises parallel gear shaft and damping wheel shaft; one end of the gear shaft meshes, through a second gear, with the first gear; the other end of the gear shaft meshes, through a third gear, with a fourth gear at one end of the damping wheel shaft; and the damping wheel shaft and the damping wheel are circumferentially fixed.

17. The lockable caster wheel of claim 1, wherein the wheel frame comprises a metal stand and a plastic shell in which the controller, the locking device, and the revolving damper are contained.

18. The lockable caster wheel of claim 17, wherein the wheel assembly is set in the middle or approximately in the middle of the plastic shell.

19. The lockable caster wheel of claim 17, wherein the wheel assembly is set in the side of the plastic shell.

* * * * *